United States Patent [19]

Fouse et al.

[11] 4,294,419

[45] Oct. 13, 1981

[54] AIRFRAME ASSEMBLY AND PROCESS

[75] Inventors: Jack A. Fouse, Dallas; Sherwood W. McClaren, III, Grand Prairie, both of Tex.

[73] Assignee: Vought Corporation, Dallas, Tex.

[21] Appl. No.: 4,965

[22] Filed: Jan. 22, 1979

[51] Int. Cl.$^3$ .......................... B64C 1/00; B23K 20/22
[52] U.S. Cl. ................................ 244/117 R; 228/157; 228/193; 228/265; 244/119
[58] Field of Search ........................ 228/193, 265, 157; 29/421, 156.8 R; 244/119, 117 R

[56] References Cited

U.S. PATENT DOCUMENTS

| | | | |
|---|---|---|---|
| 2,967,034 | 1/1961 | Eyre | 244/119 |
| 3,927,817 | 12/1975 | Hamilton et al. | 228/157 |
| 4,000,871 | 1/1977 | DeHaai | 228/119 |
| 4,013,210 | 3/1977 | Deminet | 228/193 X |
| 4,117,970 | 10/1978 | Hamilton et al. | 228/193 |

Primary Examiner—Francis S. Husar
Assistant Examiner—Kenneth J. Ramsey
Attorney, Agent, or Firm—James M. Cate; Jack A. Kanz

[57] ABSTRACT

Disclosed is a process for fabrication and assembly of airframes and airframe components utilizing the principles of diffusion bonding and superplastic forming. A preform blank or blank sheet of material capable of being superplastically formed and diffusion bonded is attached to an airframe body or casing by diffusion bonding and superplastically deformed to form a structural airframe component. The superplastically formed structural component may be diffusion bonded to other airframe components and the superplastic forming and diffusion bonding steps may be performed simultaneously or successively to progressively fabricate and assembly an airframe having unique structural geometries and characteristics without conventional machining or welding of component parts.

9 Claims, 5 Drawing Figures

AIRFRAME ASSEMBLY AND PROCESS

This invention relates to processes for assembling airframes and components thereof. More particularly, it relates to processes for progressive assembly of an airframe assembly through diffusion bonding of preselected preform components together and superplastically forming at least some of such preforms to conform to a mold and diffusion bonding additional airframe components to the superplastically formed components to form a high strength, light weight airframe assembly with minimum radar cross section.

In the design and fabrication of airframe structures, major consideration must be given to weight, structural strength and relative air flow over the complete craft. Cost of materials, cost of assembly equipment and cost of assembly labor must also be considered. In military craft designed to penetrate energy radar networks, the radar cross section presented by the airframe also becomes a major consideration. When the payload and mission of the craft have been determined, various trade-offs must be made in the design criteria to accomplish the mission objective. For example, in order to increase structural strength and decrease weight, various high strength, light weight materials have been considered for use in fabricating airframes. Unfortunately, such high strength, light weight materials such as titanium and titanium alloys are difficult and expensive to fabricate into airframe components using conventional fabrication and assembly methods. Therefore, while use of such materials may benefically affect weight and strength considerations, their use usually adversely affects the cost of materials and assembly labor factors.

In accordance with the invention, complete airframe structures and substructures may be formed, fabricated and assembled in a single assembly mold using a series of diffusion bonding and superplastic forming steps and materials susceptible of diffusion bonding and superplastic forming. The forming and assembly steps may be accomplished simultaneously or progressively to fabricate a unitary complex airframe structure without conventional welded joints or seams and in which many of the structural components are formed in place from prefrom details or blanks which have required no previous machining or the like. Accordingly, the cost of assembly is greatly reduced by eliminating many manual assembly operations. Furthermore, the cost of materials is greatly reduced by eliminating pre-assembly fabrication of many structural parts. Not only is the assembly process expedited, use of titanium and titanium alloys susceptible of diffusion bonding and superplastic forming permits the formation of extremely light weight and structurally sound structures of unique geometry. Since many of the structural components may actually be formed into their final geometric configuration during the assembly process and may be formed into any geometric configuration desired consistent with the structural design of the airframe, various airframe components such as air inlets and ducts may be readily formed in elliptical or asymmetrical frontal cross section to minimize the radar cross section of the craft. Other advantages and features of the invention will become more readily understood from the following detailed description taken in connection with the appended claims and attached drawings in which:

Superplasticity of certain metals such as titanium and various alloys of titanium, when maintained at certain temperatures, is a well known phenomenon. Likewise, it is also known that bodies of certain metals, including titanium and various alloys of titanium, when maintained in intimate contact under known pressures and within certain temperature ranges, will form a homogeneous interconnection between the two bodies by a phenomenon known as diffusion bonding.

Interconnections formed by diffusion bonding exhibit various advantages characteristics in that the bond formed is apparently an inter-atomic bond forming a homogenous monolithic structure from two or more parts. The bond is formed without the use of welding materials, fluxes or the like, and results in no enlarged welding seam as when metals are joined by conventional welding. The principles of diffusion bonding and superplastic forming of such materials and the use of these phenomena to form monolithic complex structures is exemplified by U.S. Pat. No. 3,340,101 to Fields, Jr. et al., 3,920,175 and 3,927,817 to Hamilton et al. and 4,087,037 to Schier et al.

While the prior art has demonstrated that certain complex structures may be fabricated utilizing the phenomena of diffusion bonding and superplasticity, the art has heretofore failed to recognize that because of the unique strength and weight characteristics of titanium and certain alloys of titanium, and because of the susceptibility of these materials to diffusion bonding and superplasticity, unique airframe structures may be fabricated using such materials and processes. Such airframe structures may, for example, be uniquely designed to minimize weight and also to minimize radar cross section. Furthermore, the assembly process employed may eliminate many machined parts and vastly reduce the time and manpower required to assemble the airframe. Not only is the airframe produced in accordance with the invention unique in structural characteristics, the cost of construction as well as the time required for construction is vastly reduced.

For brevity and clarity the term "airframe" is used herein to refer to a substantially hollow cylindrical body or casing adapted for powered flight by the attachment thereto or incorporation therein of lifting components such as wings, winglets or other airfoils or control or stabilizing components such as canards, elevators and the like or other empennage and may include as a structural portion thereof a duct with an opening for admitting air to the engine means for powering the completed aircraft. Such airframes may be used for either manned or unmanned craft as well as other missiles or projectiles.

Figure 1:
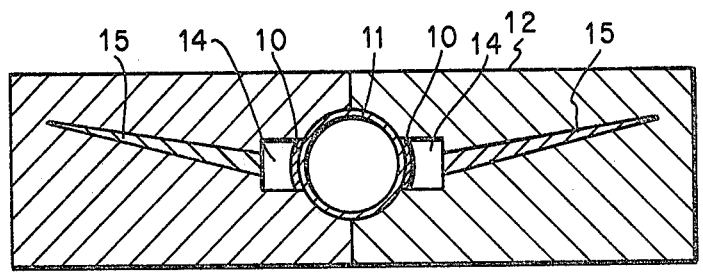
FIG. 1 is a sectional view of a missile casing or body in a superplastic forming mold illustrating the initial assembly step for fabricating an airframe in accordance with the invention.
Figure 1A:
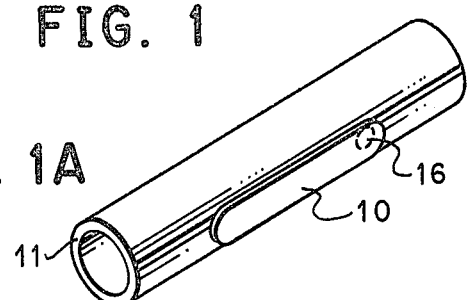
FIG. 1a is a perspective view of a segment of the missle casing shown in FIG. 1 after diffusion bonding of a structural duct preform thereto.
Figure 2:
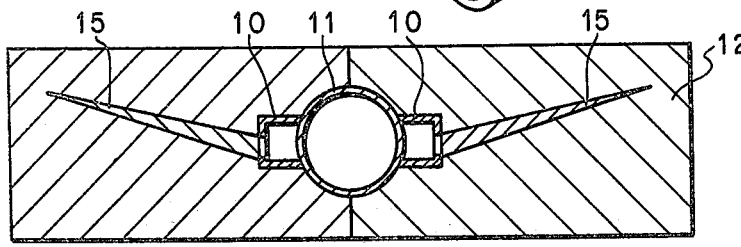
FIG. 2 is a sectional view of the casing and mold of FIG. 1 after the duct prefrom has been superplastically formed.
Figure 3:
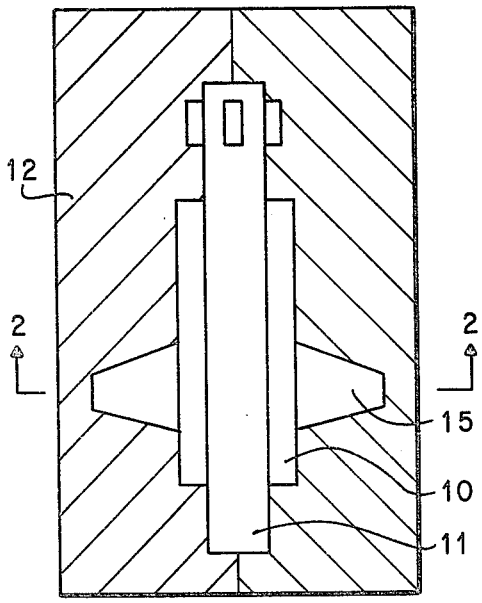
FIG. 3 is a top view of the airframe assembly of FIG. 2 with the top portion of the mold removed.

An illustrative embodiment of the process of the invention for forming and assembling an airframe for a jet-powered unmanned missile is shown in FIGS. 1-3. A preform 10 or sheet of metal capable of being superplastically formed and diffusion bonded is positioned adjacent the external surface of a substantially cylindrical missile body or casing 11. The preform 10 and/or the casing 11 is suitably formed or masked so that only a predetermined width of the periphery of the preform 10 may be diffusion bonded to the casing 11 leaving the interior face thereof unattached to the casing except along the periphery thereof. Preferably, the initial diffusion bonding step is accomplished by placing the casing 11 and the preform 10 in the desired relationship in an assembly jig or mold 12 as illustrated in FIG. 1. The mold 12 and/or the casing 11 is then heated under conditions appropriate to form a diffusion bond between the periphery of the preform 10 and the casing 11. Depending upon the structure and material composition of the casing 11, it may be necessary to pressurize the casing 11 in order to maintain sufficient pressure between the casing 11 and the preform 10 to effect diffusion bonding. After diffusion bonding of the preform 10 to the casing 11, the partially assembled structure would have the appearance illustrated by the casing segment shown in FIG. 1a.

As illustrated in FIGS. 1 and 2, the mold 12 defines a cavity 14 having the dimensions and configuration of a structural duct used for both conducting air to the missile propulsion system and attaching the wing root to the missile casing 11. As illustrated in FIG. 1, the edge of the mold surrounding and defining the inner face of the cavity 14 contacts the periphery of the preform 10 to maintain the preform 10 in the desired position during diffusion bonding and superplastic forming thereof and exerts sufficient pressure on the periphery to effect diffusion bonding.

A wing assembly structure 15 carried by the mold 12 is positioned in the mold 12 in the desired spatial relationship to the casing 11 with its root face forming a part of the outer face of the cavity 14.

After bonding of the preform 10 to the casing 11 (or simultaneously therewith) pressure is applied across the preform 10 to deform the preform 10 to conform to the dimensions and configuration of the mold cavity 14 by superplastic forming. The superplastic forming step is accomplished by injecting an appropriate pressurized fluid between the casing 11 and the preform 10 through an aperture 16 or the like. The mold cavity 14 must, of course, be appropriately vented and, if desired, the mold cavity may be appropriately equipped so that the cavity 14 may be evacuated by a vacuum system during the molding process.

Figure 2A:
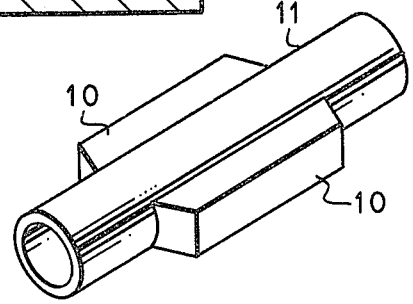
FIG. 2a is a perspective view of a segment of the missile casing and duct after the forming step illustrated in FIG. 2.

When the preform 10 is fully deformed to conform with the internal dimensions of the cavity 14 the preform 10 will form an air duct bonded to the casing 11 as illustrated in FIG. 2a. However, when the preform 10 is expanded to conform to the dimensions of the cavity 14, the preform 10 is brought into contact with the edge face of the wing assembly structure 15 forming a portion of the cavity face. Accordingly, sufficient pressures and temperatures may be applied to effect diffusion bonding of the wing assembly structure 15 to the structural duct structure superplastically formed from the preform 10. Thus the preform 10 is transformed from a preform blank or blank sheet into a structural duct, bonded to the casing 11 and bonded to the wing assembly structure 15 to form a major portion of an airframe assembly in a molding and bonding operation which is relatively simple and requires no prior casting or machining of the structural duct. Furthermore, the entire airframe assembly is produced without conventional welding, riveting or the like to assemble and attach the major components; and the final product is an essentially monolithic, integral structure.

It will be appreciated that similar superplastic forming and diffusion bonding operations may be performed simultaneously or consecutively to assembly a complete airframe in a single multi-cavity mold or a plurality of molds assembled to simultaneously or progressively assemble the airframe. For example, the airframe illustrated in section in FIGS. 1 and 2 may be assembled as described above and, simultaneously therewith, other components of the airframe such as stabilizers, elevators or other empennage superplastically formed and diffusion bonded to the casing 10 as illustrated in FIG. 3.

A unique advantage of the assembly process described above is transformation of a preform blank into a structural component of an airframe assembly and attachment of other components of the assembly thereto in a progressive or simultaneous process to form an integral structure without prior machining or precision fabrication of the structural component. Furthermore, the materials employed, such as titanium and alloys of titanium which are capable of being diffusion bonded and also exhibit superplasticity, are ideally suited for airframe structures because of their high strength and low weight. Because of the strength and weight characteristics of these materials they are particularly suitable for airframe components. However, the difficulties encountered in fabricating structural components therefrom using conventional techniques, and the difficulties encountered is assembling such components to form an integral airframe structure using conventional methods has severely limited their use. Utilizing the principles of the invention, however, not only fully exploits the advantageous strength and weight characteristics of the materials, but also simplifies assembly equipment and materially reduces time, equipment and manpower required for assembly while resulting in a superior product with heretofore unobtainable characteristics of its own. For example, since the structural duct is formed in place, only the mass of material required to effect the desired structural load capacity is used. Additional reinforcement and the attendant attachment accessories such as rivets, welding seams and welding butt plates are eliminated. Furthermore, since the material may be formed into any desired configuration while superplastic unique structural configurations which are unobtainable or obtainable only with extreme difficulty may be readily formed. In the specific embodiment described, this unique characteristic permits the fabrication of an airframe including a structural duct and inlet for the duct configured to present a minimum radar cross section.

Since the material may be formed to any desired shape while superplastic, the forming cavity may be suitably designed to form a structural unit with maximum loading characteristics consistent with minimum cross sectional mass as viewed along the fore-to-aft axis. Thus primary radar reflection will be minimized. Furthermore, it is well known that the geometric configuration of air ducts leading to a jet engine and the geometric configuration of the duct inlet can dramatically affect the apparent radar cross section of an aircraft. A rectangular duct leading directly to the mass of a jet engine and having a rectangular inlet lying in the plane normal to the fore-to-aft axis of the duct may act as a waveguide and actually reinforce the radar return. However, since the structural duct formed in accordance with the invention is formed to conform to a mold cavity while in the superplastic state, the designer is free to form the duct geometry in such complex non-linear asymmetrical shapes as may be required to eliminate or minimize radar signal reinforcement. Likewise, the duct inlet may be formed in non-planar asymmetrical geometries to minimize radar reflection. While the geometry of the resulting duct may be quite complex, the expense of forming such complex shapes is limited to forming a complex mold cavity instead of machine forming each duct as would be required in the conventional fabrication and assembly process.

While the invention has been described with reference to fabrication of a particular missile casing structure, it is to be understood that the principles thereof are not so limited. Similar superplastic forming and diffusion bonding may be used to fabricate particular subassemblies such as engine nacelles, control surfaces, airfoils and the like and attach same to other airframe components. Accordingly, the forms of the invention shown and described in detail are to be taken as preferred embodiments of same, and various changes and modifications may be resorted to without departing from the spirit and scope of the invention as defined by the appended claims.

We claim:

1. The method of assembling a portion of an airframe having a minimum radar cross section comprising the steps of:
   (a) diffusion bonding the periphery of a preform capable of being superplastically formed and diffusion bonded onto the outer surface of a substantially cylindrical casing,
   (b) placing said cylindrical casing in a mold having a cavity therein substantially conforming to the external dimension of a structural air duct, said cavity enclosing said preform and said mold supporting a wing structure with the wing root face forming a portion of said cavity, and
   (c) heating said preform to a superplastic forming and diffusion bonding temperature and applying sufficient pressure across said preform to superplastically deform said preform to conform to the dimensions of said mold and diffusion bond said deformed preform to said wing root face.

2. The method set forth in claim 1 wherein said preform and said casing are placed in said mold and the periphery of said preform is diffusion bonded to said casing immediately prior to superplastic deforming of said preform.

3. The method set forth in claim 1 including the step of diffusion bonding additional airframe components to said casing simultaneously with diffusion bonding of said preform to said casing.

4. The method set forth in claim 1 wherein said preform is superplastically formed into an air duct having non-linear asymmetrical dimensions.

5. The method set forth in claim 4 wherein the inlet of said duct is formed into a non-planar asymmetrical geometry.

6. The product made by the method of claim 1.

7. The method of forming and assembling a portion of an airframe having minimum radar cross section comprising the steps of:
   (a) diffusion bonding at least a portion of a preform capable of being superplastically formed and diffusion bonded to a first structural component of an airframe, the first structural component comprising a substantially cylindrical casing structure,
   (b) placing said cylindrical, first structural component and preform in a mold having a cavity therein substantially conforming to the external configuration of a second structural component of said airframe, said cavity enclosing said preform, and
   (c) heating said preform to a superplastic forming and diffusion bonding temperature and applying sufficient pressure across said preform to superplastically deform said preform to conform to the mold cavity.

8. The method set forth in claim 7 wherein said structural components are placed in a forming and assembly mold and the diffusion bonding and superplastic forming steps are performed simultaneously.

9. The method set forth in claim 7, wherein said mold supports a third airframe structural component having a surface forming a portion of said cavity, the step of applying sufficient pressure across said preform to superplastically deform said preform comprising applying sufficient pressure to diffusion bond said deformed preform to said surface of the third airframe structural component forming a portion of said cavity.

* * * * *